US012749015B1

(12) United States Patent
Bihl

(10) Patent No.: US 12,749,015 B1
(45) Date of Patent: Sep. 29, 2026

(54) METHODS AND SYSTEM FOR ANALOGICAL LEARNING IN MACHINE LEARNING PROCESSES

(71) Applicant: Government of the United States, as represented by the Secretary of the Air Force, Wright-Patterson AFB, OH (US)

(72) Inventor: Trevor Bihl, Franklin Furnace, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 934 days.

(21) Appl. No.: 18/068,925

(22) Filed: Dec. 20, 2022

Related U.S. Application Data

(60) Provisional application No. 63/292,576, filed on Dec. 22, 2021, provisional application No. 63/292,579, filed on Dec. 22, 2021.

(51) Int. Cl.
*G06N 7/01* (2023.01)
*G06N 20/00* (2019.01)

(52) U.S. Cl.
CPC ............... *G06N 20/00* (2019.01); *G06N 7/01* (2023.01)

(58) Field of Classification Search
CPC ................................ G06N 20/00; G06N 7/01
See application file for complete search history.

(56) References Cited

U.S. PATENT DOCUMENTS

| | | | |
|---|---|---|---|
| 7,599,902 | B2 | 10/2009 | Fox |
| 2016/0224894 | A1 | 8/2016 | Soon-Shiong |
| 2020/0342323 | A1 | 10/2020 | Liu |
| 2021/0312611 | A1 | 10/2021 | Neumann |

OTHER PUBLICATIONS

Zhou, L., et al, Learning to Learn Image Classifiers with Visual Analogy, [received Nov. 29, 2025]. Retrieved from Internet: <https://openaccess.thecvf.com/content_CVPR_2019/html/Zhou_Learning_to_Learn_Image_Classifiers_With_Visual_Analogy_CVPR_2019_paper.html> (Year: 2019).*

Ba, J., et al, Predicting Deep Zero-Shot Convolutional Neural Networks using Textural Descriptions, [received Nov. 29, 2025]. Retrieved from Internet: <https://www.cv-foundation.org/openaccess/content_iccv_2015/html/Ba_Predicting_Deep_Zero-Shot_ICCV_2015_paper.html> (Year: 2015).*

(Continued)

*Primary Examiner* — Miranda M Huang
*Assistant Examiner* — Bart I Rylander
(74) *Attorney, Agent, or Firm* — AFMCLO/JAZ; John T. Addicks

(57) ABSTRACT

An internal information machine learning process, the process including providing a machine learning data set and a plurality of declared classes. Inputting the machine learning data set and the plurality of declared classes into a machine learning algorithm. The machine learning algorithm providing a set of probabilities by class which are further provided to an analogical algorithm. The analogical algorithm providing at least one assigned analogy description which further provides new information to the machine learning process; and enables the machine learning.

3 Claims, 5 Drawing Sheets

(56) References Cited

OTHER PUBLICATIONS

Drozd, A., et al, Word Embeddings, Analogies, and Machine Learning: Beyond King—Man + Woman = Queen, [received Nov. 29, 2025]. Retrieved from Internet:<https://aclanthology.org/C16-1332/> (Year: 2016).*

Rezende, D., et al, One-Shot Generalization in Deep Generative Models, [received Nov. 29, 2025]. Retrieved from Internet:<https://proceedings.mlr.press/v48/rezende16.html> (Year: 2016).*

Yu, C., et al, Efficient Intelligent Automatic Image Annotation Method based on Machine Learning Techniques, [received Nov. 29, 2025]. Retrieved from Internet:<https://ieeexplore.ieee.org/abstract/document/8991727> (Year: 2019).*

Bounhas, M., et al, Analogical Classification: Handling Numerical Data, [received Nov. 29, 2025]. Retrieved from Internet:<https://link.springer.com/chapter/10.1007/978-3-319-11508-5_6> (Year: 2014).*

Liu, W., et al, Few-Shot Text and Image Classification via Analogical Transfer Learning, [received Nov. 29, 2025]. Retrieved from Internet:<https://dl.acm.org/doi/abs/10.1145/3230709> (Year: 2018).*

Marc Pickett, David Aha; Using cortically-inspired algorithms for analogical learning and reasoning, Biologically Inspired Cognitive Architectures (2013), http://dx.doi.org/10.1016/j.bica.2013.07.003.

Ichien, N., Liu, Q., Fu, S., Holyoak, K. J., Yuille, A. L., & Lu, H. (2021). Visual analogy: Deep learning versus compositional models. In T. Fitch, C. Lamm, H. Leder, & K. Teßmar-Raible (Eds.), Proceedings of the 43rd Annual Meeting of the Cognitive Science Society. Cognitive Science Society. Jul. 26, 2021.

Cheng, Yu et al., “Feedback-Driven Multiclass Active Learning for Data Streams”; CIKM ’13: Proceedings of the 22nd ACM international conference on Information & Knowledge Managementpp. 1311-1320https://doi.org/10.1145/2505515.2505528; Published: Oct. 27, 2013.

Bart Theeten, Frederik Vandeputte, and Tom Van Cutsem. 2019. Import2vec learning embeddings for software libraries. In Proceedings of the 16th International Conference on Mining Software Repositories (MSR ’19). IEEE Press, 18-28. <https://doi.org/ 10.1109/MSR.2019.00014> (Year: 2019).

* cited by examiner

METHODS AND SYSTEM FOR ANALOGICAL LEARNING IN MACHINE LEARNING PROCESSES

PRIORITY

This application claims the benefit of priority under 35 U.S.C. § 119(e) to U.S. Provisional Application Ser. No. 63/292,579 entitled "Methods and System for Analogical Learning in Machine Learning Processes", filed Dec. 22, 2021. This application further claims the benefit of priority under 35 U.S.C. § 119(e) to U.S. Provisional Application Ser. No. 63/292,576 entitled "Methods and System for Analogical Learning in Machine Learning Processes", filed Dec. 22, 2021, the contents of both of which are incorporated herein by reference in their entirety.

RIGHTS OF THE GOVERNMENT

The invention described herein was made by employees of the United States Government and may be manufactured and used by or for the Government of the United States of America for governmental purposes without the payment of any royalties thereon or therefore.

BACKGROUND OF THE INVENTION

Computer recognition systems are traditionally narrow in how they learn and focus on labeled training data. The list of labels are the classes that the underling classification algorithm sorts data into. Thus, traditionally, these methods must identify any new image, or subset of images, as one of the predefined classes. Transfer learning approaches can extend pre-trained classifiers to recognize new classes, but again this involves identifying new labels for the algorithm to learn. While transfer learning can extend the underlying methods, there are still significant limitations as the computer version cannot learn new classes on its own. By design, every observation must be identified as one of the known classes/groups, even if it is a low confidence identification.

What is needed for computer vision to enable truly autonomous systems are self-learning methods which can identify new classes/groups as more data is explored. This involves learning as we believe humans and other animals do, by learning by analogy. Through analogical learning, we are able to naturally label new data by relational experiences and memories.

This disclosure develops a family of approaches to processes data for autonomous analogical learning in computer systems.

SUMMARY OF THE INVENTION

An internal information machine learning process, the process including providing a machine learning data set and a plurality of declared classes. Inputting the machine learning data set and the plurality of declared classes into a machine learning algorithm. The machine learning algorithm providing a set of probabilities by class which are further provided to an analogical algorithm. The analogical algorithm providing at least one assigned analogy description which further provides new information to the machine learning process; and enables the machine learning.

The process may alternatively include providing a machine learning data set and a plurality of declared classes. Inputting the machine learning data set and the plurality of declared classes into a machine learning algorithm. The machine learning algorithm providing a set of probabilities by class which are further provided to an analogical algorithm. Providing a dictionary which provides input to the analogical algorithm such that the analogical algorithm provides at least one inferred out of class declaration. The at least one inferred out of class declaration providing new information to the machine to complete the machine learning process.

The process may alternatively include providing a machine learning data set to create a feature extraction, and further providing a plurality of declared classes. Inputting the feature extraction and the plurality of declared classes into a machine learning algorithm to complete a feature extraction and classification process. The machine learning algorithm providing a set of probabilities by class which are further provided to an analogical algorithm. Providing a dictionary also providing input to the analogical algorithm such that the analogical algorithm provides at least one inferred out of class declaration. The at least one inferred out of class declaration providing new information. The new information being provided back to the plurality of declared classes by an update feedback, the update feedback supplied new information providing a revised classes. wherein the revised classes are used to revise or update the available declared classes for continued machine learning.

In one embodiment the update feedback continues for a set number of iterations, completing the iterative internal information machine learning process. The update feedback may continue in one embodiment until the set of probabilism by class reaches a prescribed level of confidence, completing the iterative internal information machine learning process.

In one embodiment the internal information and dictionary machine learning process includes providing a machine learning data set to create a feature extraction and a plurality of declared classes. Inputting the feature extraction and the plurality of declared classes into a classification. The classification providing a set of probabilities by class which are further provided to an analogical algorithm. The feature extraction further providing a feed-forward process for input to the analogical algorithm in parallel with the set of probabilities by class. A dictionary also providing input to the analogical algorithm to provide at least one inferred out of class declaration. The inferred out of class declaration providing new information where the new information to the machine learning process; and enables the machine learning.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
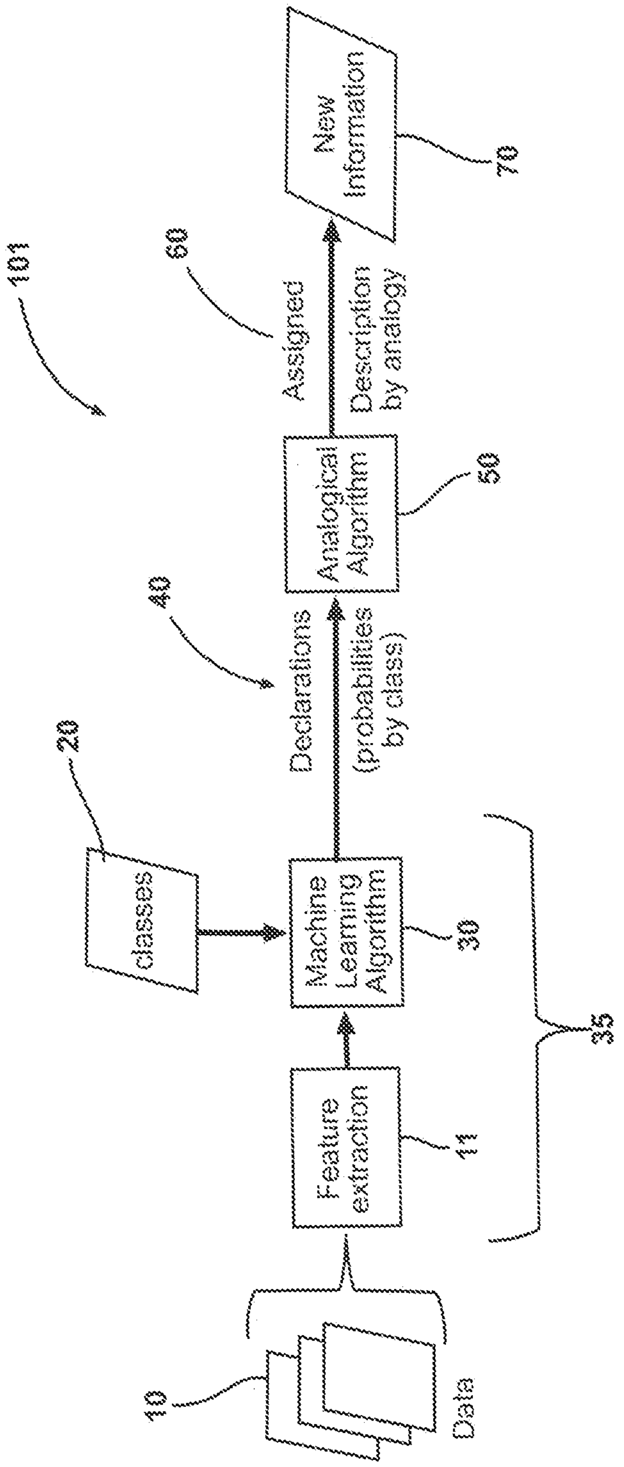
FIG. 1 is an illustration of a process for Analogical Learning for Machine Learning Using only internal information.

As illustrated in FIG. 1, An internal information machine learning process 101 includes data, such as live sensor data or a machine learning data set 10 and a plurality of declared classes 20 are input to a feature extraction and classification process 35. The feature extraction and classification process 35 is separated into both the feature extraction process 11 and a machine learning algorithm 30, which are trained and developed simultaneously or separately. Additionally, this separation permits retraining the machine learning algorithm 30 can be accomplished through transfer learning approaches, whereby new feature extractions 11 are not learned but the machine learning algorithm is retrained or replaced for new classes or a new data set with the feature extraction 11 being retained from the original process. As a result of this separation, the machine learning algorithm 30 can be more quickly retrained or new feature methods 11 could be introduced. The machine learning process provides declarations, a set of scores or probabilities, by class 40 which are provided to an analogical learning algorithm 50. The analogical algorithm 50 considers the declarations by classes and provides at least one assigned analogy description 60 which provides a new information 70 to the machine. The new information 70 in the form of new classes which are made of multiple groupings of classes is output for the given data from the machine learning (from which the machine learns) system, completing the machine learning process 101.

The machine learning data set 10 should be trained on similar data. For example, a computer vision system trained on a library of 64×64 pixel images, with an associated list of classes. Once trained, a deployed version of this system should take in new image data that is 64×64, and then provide declarations on the new images to one of the known classes based on the classification of the selected machine learning algorithm.

When such a machine learning system is deployed and placed into use, such as for this example with live 64×64 pixel video data being classified for each frame, objects which were not defined by the list of classes are possibly encountered. However, one limitation of the prior art is that an object must be classified as one of the known classes. However, the process in FIG. 1 adds the ability to learn by analogy new classes which are then defined as being similar to multiple known classes.

A set of probabilities by class 40 which passes the class declaration along with the probabilities, or confidences, to the analogical algorithm 50. The analogical algorithm 50 is selected based upon what machine learning is desired from the process. The probabilities associated with a given data observation and the list of known classes are considered in the analogical algorithm 50 to develop an assigned description by analogy 60 which is yielded by the analogical algorithm 50 and the associated set of probabilities by class 40 (probabilities). The result is new information 70 by analogy of what is known, to further the machine learning.

By example, a new 64×64 image of a commercial airplane is processed by the machine learning system. However, this machine learning system does not have "airplane" as a class, yet it has the following 8 classes: automobiles, birds, cats, deer, dogs, ships, trains, and truck. The airplane must be classified as one of these 8 classes, in this conceptual example the new image might be classified as an automobile. But the probabilities might be relatively low, e.g. 31% automobile, 30% bird, 20% ship, 10% train, 5% truck, 2% cat, 1% deer, 1% dog. While the airplane was necessarily classified as an automobile by the nature of how machine learning works, this is not a high confidence declaration. But by feeding this into the analogical algorithm, a composite description to this image can be generated and thus results in new information. For this example, the new information could be: "an image of an automobile with strong similarities to birds and ships and some aspects of a train and truck."

Figure 2:
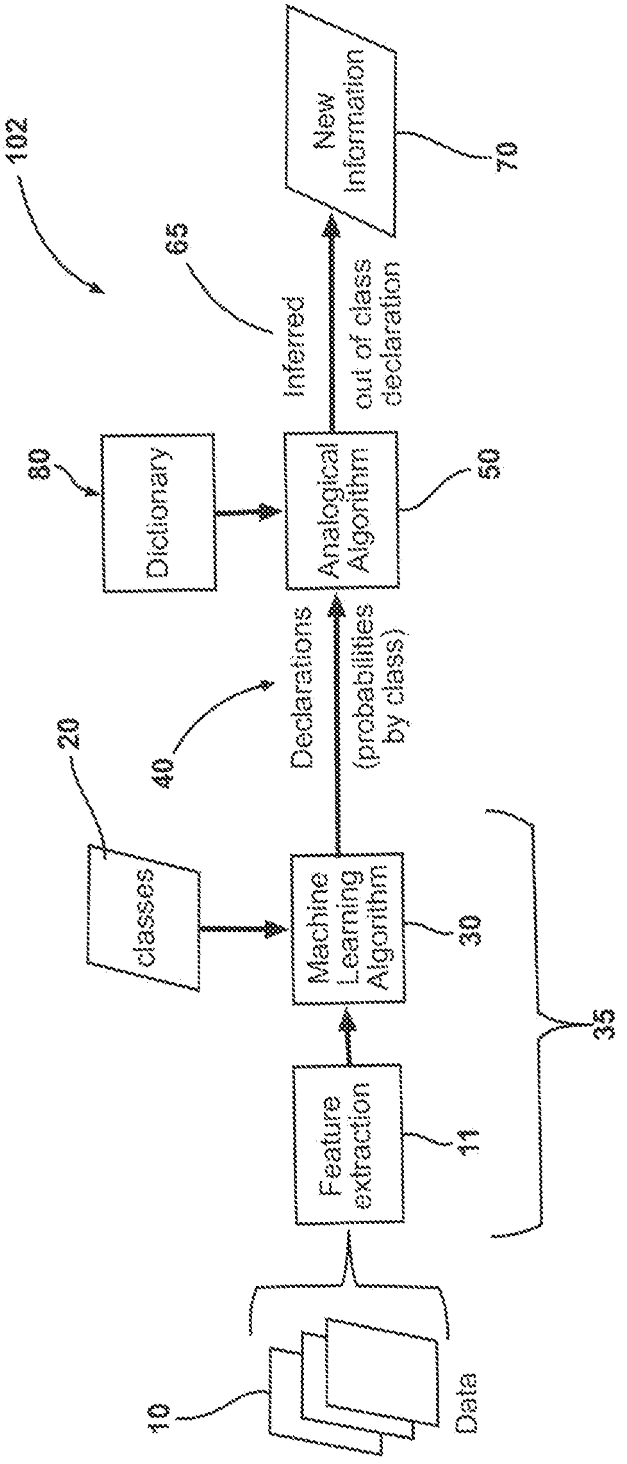
FIG. 2 is an illustration of a process for Analogical Learning for Machine Learning using both internal information and a dictionary.

FIG. 2 incorporates all of FIG. 1 and a dictionary 80 to provide an internal information and dictionary machine learning process 102. The internal information and dictionary machine learning process 102 includes a machine learning data set 10 and a plurality of declared classes 20 are input to a feature extraction and classification process 35. The feature extraction and classification process 35 is separated into both the feature extraction process 11 and a machine learning algorithm 30, which are trained and developed simultaneously or separately. Additionally, this separation permits retraining the machine learning algorithm 30 can be accomplished through transfer learning approaches, whereby new feature extractions 11 are not learned but the machine learning algorithm is retrained or replaced for new classes or a new data set with the feature extraction 11 being retained from the original process. As a result of this separation, the machine learning algorithm 30 can be more quickly retrained or new feature methods 11 could be introduced. The machine learning process provides declarations, a set of scores and/or probabilities, by class 40 which are provided to an analogical algorithm 50. The dictionary 80 is added to the analogical algorithm 50 to provide at least one inferred out of class declaration 65. The at least one inferred out of class declaration 65 provides new information 70 in the form of a new class which can be a composite of the known classes 20 and/or include classes extrapolated from terms looked up in the dictionary 80. The new information 70 enables the machine learning (from which the machine learns), completing the machine learning process 102.

The dictionary 80 enables the analogical algorithm 50 to develop and deliver a composite description with internal and external information. For example, the example described above could now yield new information, such as: "an image of a 'large' 'flying' automobile due to strong similarities in this image of automobiles, birds, and ships."

Figure 3:
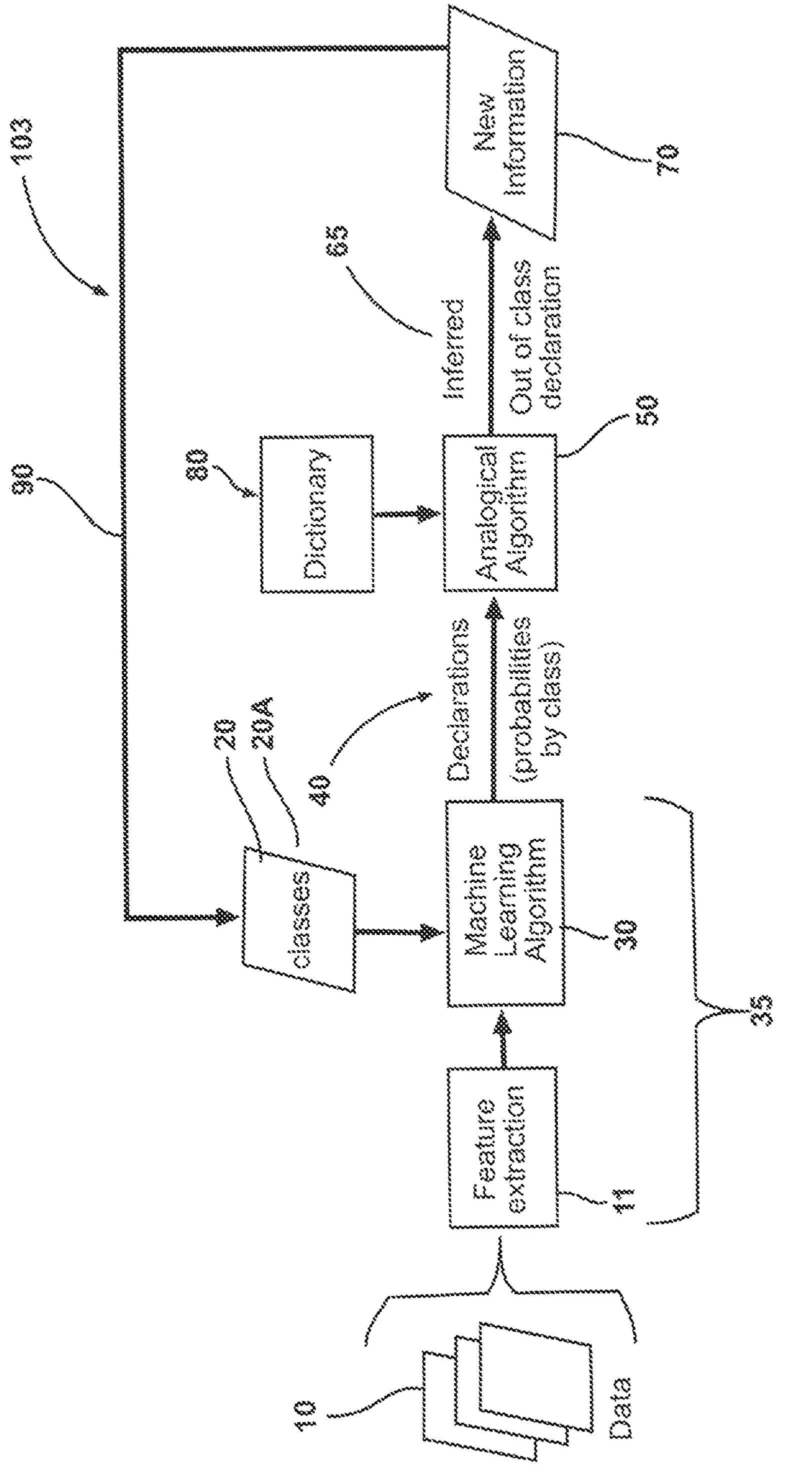
FIG. 3 is an illustration of a process for Analogical Learning for Machine Learning with feedback for process improvement and a dictionary.

FIG. 3 illustrates all of FIG. 2 and adds at least one feedback 90 iteration between the new information 70 to the plurality of declared classes 20 to provide an iterative internal information machine learning process 103. The feedback 90 for process improvement and a dictionary machine learning process 103 includes a machine learning data set 10 and a plurality of declared classes 20 are input to a feature extraction and classification process 35. The feature extraction and classification process 35 is separated into both the feature extraction process 11 and a machine learning algorithm 30, which are trained and developed simultaneously or separately. Additionally, this separation permits retraining the machine learning algorithm 30 can be accomplished through transfer learning approaches, whereby new feature extractions 11 are not learned but the machine learning algorithm is retrained or replaced for new classes or a new data set with the feature extraction 11 being retained from the original process. As a result of this separation, the machine learning algorithm 30 can be more quickly retrained or new feature methods 11 could be introduced. The machine learning algorithm provides a set of probabilities by class 40 which are provided to an analogical algorithm 50. The dictionary 80 is added to the analogical algorithm 50 to provide at least one inferred out of class declaration 65. The at least one inferred out of class declaration 65 provides new information 70 in the form of a new class which can be a composite of the known classes 20 and/or include classes extrapolated from terms looked up in the dictionary 80. The new information 70 enables the machine learning (from which the machine learns), completing the machine learning process 102. The feedback 90 may continue for a set number of iterations or until the set of probabilism by class 40 reaches a prescribed level of confidence, completing the iterative internal information machine learning process 103.

By incorporating the feedback 90, the classes can be updated 20A to include new classes which were learned by analogy 90. Further, as new classes are added to the library, the machine learning algorithms 30 can be updated directly or retrained. Retraining the machine learning algorithm 30 can be accomplished through transfer learning approaches, whereby new feature extractions 11 are not learned but the machine learning algorithm is retrained or replaced for new classes with the feature extraction 11 being retained from the original process. As a result of this separation, the machine learning algorithm 30 can be more quickly retrained to learn a new feature extraction mapping. Here, the selected analogical algorithm 50 can develop composite description with internal and external information and then create new classes 90 as they are learned and then update the machine learning algorithm 30 to include these new classes for subsequent data. For example, the example described above would now yield new information, such as: "an image of a 'large' 'flying' automobile due to strong similarities in this image of automobiles, birds, and ships." and then, assuming sufficient examples of this "large flying automobile" were detected, the overall system would add this "large flying automobile" as a class and then this would be considered along with the previously known classes.

Other situations may not wish to deploy new classes on the fly, e.g. liability concerns, but they may wish to develop meanings from underlying data features. The underlying analogical process of FIG. 4 is designed to provide this with a feed forward process 12 wherein the feedforward process 12 takes the extracted features 11 and then process with the feed forward process 12.

Figure 4:
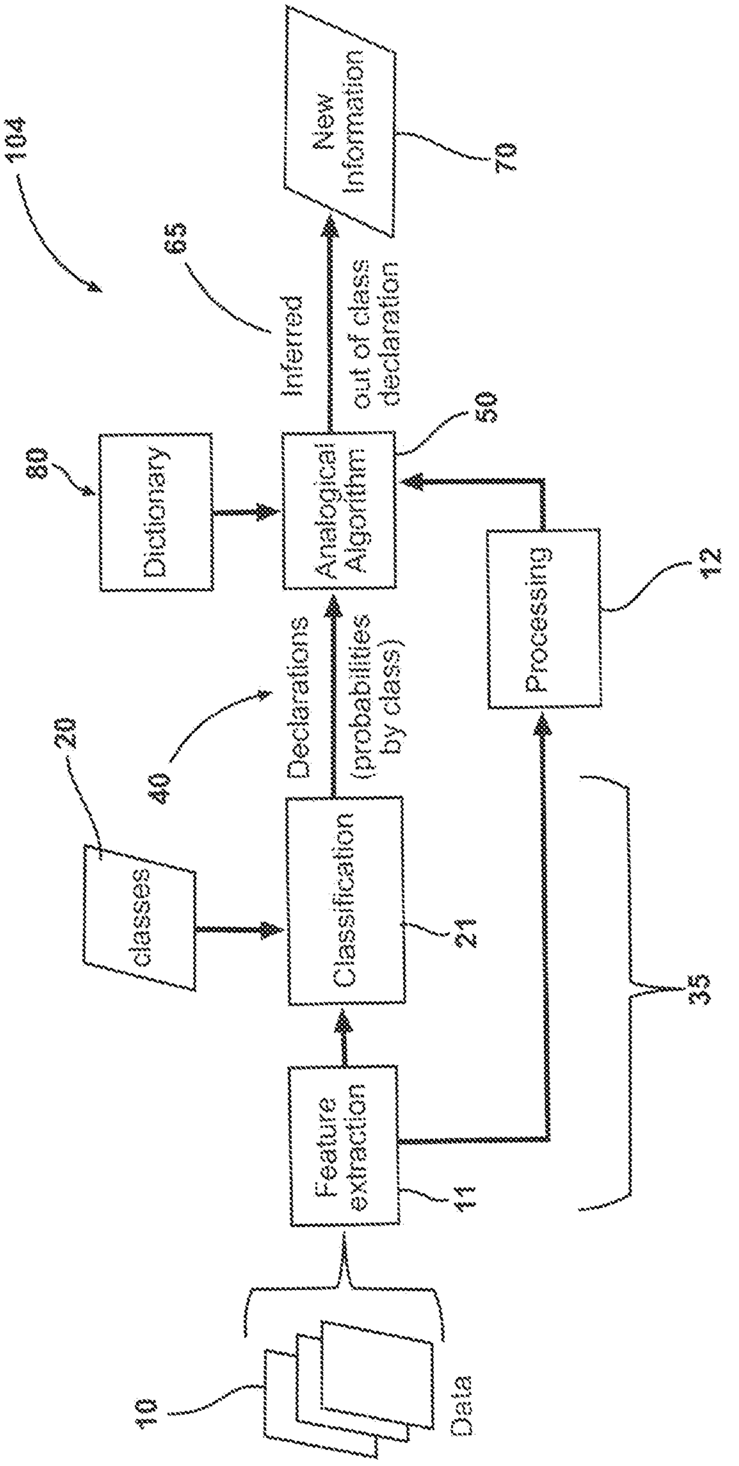
FIG. 4 is an illustration of a process for Analogical Learning for Machine Learning using a feedforward mechanism for features along with internal information and a dictionary.

FIG. 4 illustrates all of FIG. 3 with the feedback 90 omitted. As illustrated a machine learning data set 10 and a plurality of declared classes 20 are input to a feature extraction and classification process 35. The feature extraction and classification process 35 is separated into both the feature extraction process 11 and a machine learning algorithm 30, which are trained and developed simultaneously or separately. Additionally, this separation permits retraining the machine learning algorithm 30 can be accomplished through transfer learning approaches, whereby new feature extractions 11 are not learned but the machine learning algorithm is retrained or replaced for new classes or a new data set with the feature extraction 11 being retained from the original process. As a result of this separation, the machine learning algorithm 30 can be more quickly retrained or new feature methods 11 could be introduced. After the machine learning algorithm a generated set of probabilities by class 40 are analyzed by the analogical algorithm 50 along with the feed-forward processing 12 and the dictionary 80. The analogical algorithm provides at least one inferred out of class declaration 65, which further provides the new information 70. The new information 70 enables the machine learning (from which the machine learns), completing the machine learning process 104.

By incorporating the feed-forward process 12, the processing can develop simple understandings, e.g. shape or syntactical, and linkages between the features of the data which are then fed into the analogical algorithm. The benefit of this feed-forward process is that the selected analogical algorithm can develop composite description with internal and external information, as well as descriptions of associated features. For example, the example described above could now yield new information, such as: "an image of a 'large' 'flying' automobile with triangle features on the edges which are similar to features found on birds and a large body similar to a ship."

While this approach could yield new information as above in FIG. 4: "an image of a 'large' 'flying' automobile with triangle features on the edges which are similar to features found on birds and a large body similar to a ship." Given that new classes can be instantiated, multiple "large flying automobile" classes could be uniquely developed due to differences in features. For example, a picture of a missile could be described also as a "large flying automobile" but with a description being: "an image of a 'large' 'flying' automobile with features on the sides similar to a bird and features on the back similar to a deer [flames]." Such other classes could be added to library of classes or combined into meta-classes as needed or desired in the construct.

Figure 5:
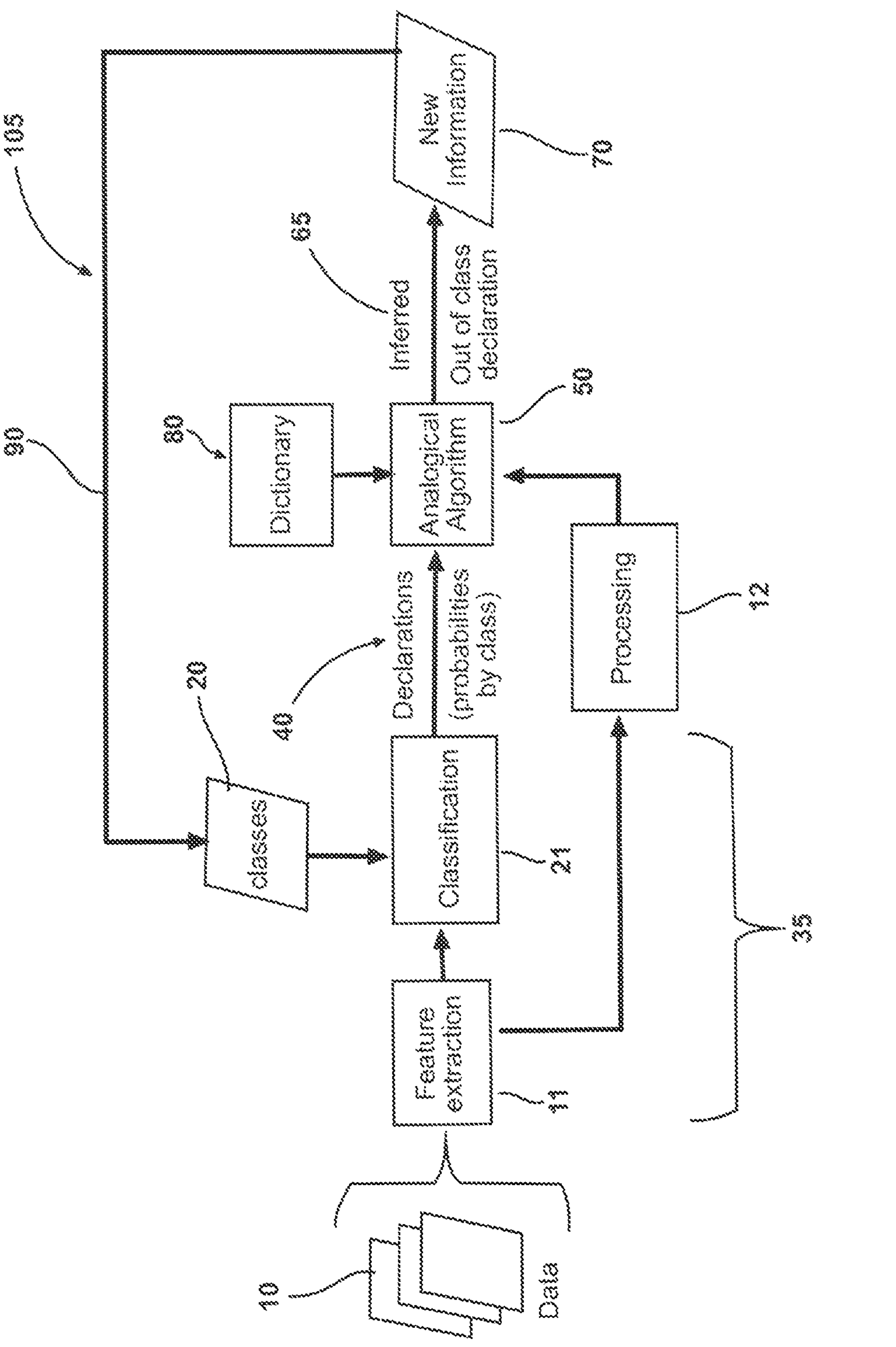
FIG. 5 is an illustration of an Analogical Learning for Machine Learning using both a feedback process to retain new classes and a feedforward process for features, and with a dictionary.

If it is permissible for a situation to allow all the above functionality, the extended analogical process of FIG. 5 may be employed integrating all the above internal process improvements. The selected analogical algorithm can develop composite descriptions with internal and external information, as well as descriptions of associated features, as well as expanding the library of classes.

Fully integrated FIG. 5 illustrates an internal information machine learning process 105 that includes a machine learning data set 10 and a plurality of declared classes 20 are input to a feature extraction and classification process 35. The feature extraction and classification process 35 is separated into both the feature extraction process 11 and a machine learning algorithm 30, which are trained and developed simultaneously or separately. Additionally, this separation permits retraining the machine learning algorithm 30 can be accomplished through transfer learning approaches, whereby new feature extractions 11 are not learned but the machine learning algorithm is retrained or replaced for new classes or a new data set with the feature extraction 11 being retained from the original process. As a result of this separation, the machine learning algorithm 30 can be more quickly retrained or new feature methods 11 could be introduced. After the machine learning algorithm a generated set of probabilities by class 40 are analyzed by the analogical algorithm 50 along with the feed-forward processing 12 and the dictionary 80. The analogical algorithm provides at least one inferred out of class declaration 65, which further provides the new information 70. The new information 70 enables the machine learning (from which the machine learns), completing the machine learning process 105.

While the present invention has been illustrated by a description of one or more embodiments thereof and while these embodiments have been described in considerable detail, they are not intended to restrict or in any way limit the scope of the appended claims to such detail. Additional advantages and modifications may readily appear to those skilled in the art. The invention in its broader aspects is therefore not limited to the specific details, representative apparatus and method, and illustrative examples shown and described. Accordingly, departures may be made from such details without departing from the scope of the general inventive concept.

The invention claimed is:

1. An internal information machine learning process, the process including:

providing a machine learning data set, a plurality of declared classes, and a dictionary comprising a plurality of descriptive terms;

inputting a target item having a consistent data format and structure as an item from the machine learning data set into a machine learning algorithm, the machine learning algorithm extracting a set of features from the target item and, providing a set of probabilities corresponding to the plurality of declared classes based on at least a subset of the set of features, providing the set of probabilities and the set of features to an analogical algorithm, the analogical algorithm generating a composite analogy description by:

selecting at least one descriptive term from the dictionary based on the set of features extracted from the target item;

synthesizing the selected descriptive term with at least one of the declared classes identified from the set of probabilities to form the composite analogy description, wherein the composite analogy description characterizes the target item with a synthesized definition not present in the plurality of declared classes or the dictionary; and updating the plurality of declared classes with the synthesized definition.

2. The internal information machine learning process of claim 1 wherein the update feedback continues for a set number of iterations, completing the iterative internal information machine learning process.

3. The internal information machine learning process of claim 1 wherein the update feedback continues until the set of probabilism by class reaches a prescribed level of confidence, completing the iterative internal information machine learning process.

* * * * *